United States Patent [19]

Koopman

[11] 4,049,217
[45] Sept. 20, 1977

[54] FISHING REEL DRIVE MECHANISM

[76] Inventor: Richard Koopman, 85 Ganby St., West Hartford, Conn. 06002

[21] Appl. No.: 618,478

[22] Filed: Oct. 1, 1975

[51] Int. Cl.² .................... A01K 89/015; A01K 89/02
[52] U.S. Cl. ........................... 242/213; 192/14; 242/215; 242/219
[58] Field of Search ............ 242/211, 212, 213, 214, 242/215, 216, 217, 219, 84.5 R, 84.51 R; 192/14; 64/30 R, 30 C; 254/187 R, 187 G

[56] References Cited

U.S. PATENT DOCUMENTS

| | | | |
|---|---|---|---|
| 1,836,755 | 12/1931 | Hirsch | 242/213 |
| 1,941,739 | 1/1934 | Crawford | 242/219 |
| 2,984,433 | 5/1961 | Clark | 242/214 |
| 3,139,241 | 6/1964 | Johnson | 242/214 |
| 3,806,060 | 4/1974 | Valentine | 242/215 |
| 3,874,615 | 4/1975 | Fukushima | 242/219 |

*Primary Examiner*—Billy S. Taylor
*Attorney, Agent, or Firm*—Prutzman, Hayes, Kalb & Chilton

[57] ABSTRACT

A fly reel having a removable spool and a cup-shaped frame with the drive operating components being mounted on the bottom of the cup-shaped frame. The drive features a one-way stepped up direct drive transmission and brake subassembly suited to effect direct spool drive with the brake rendered ineffective. Brake actuation is accomplished to apply a controlled braking force on the spool for line tensioning during run-out either by manually operating a direct drive throw-out lever or automatically upon reverse rotation of the spool in an unwinding direction caused by any pull on the line.

18 Claims, 5 Drawing Figures

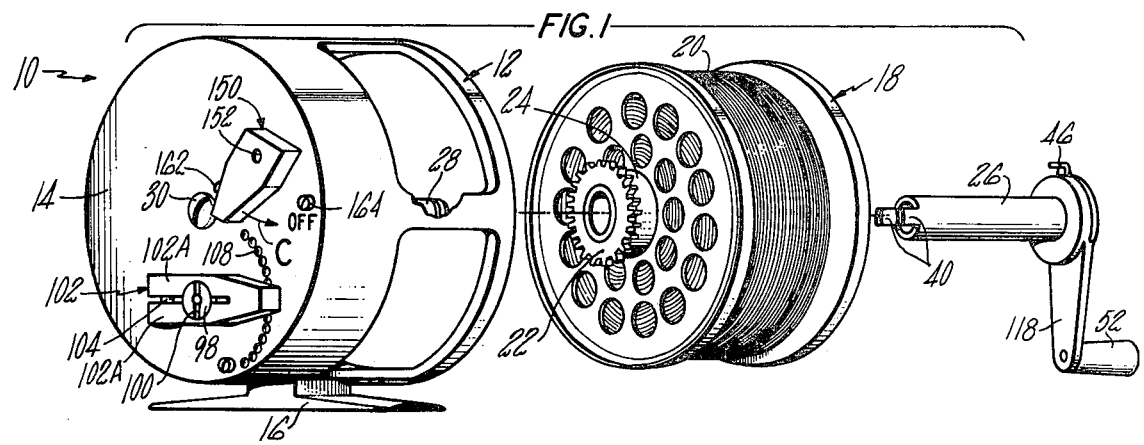
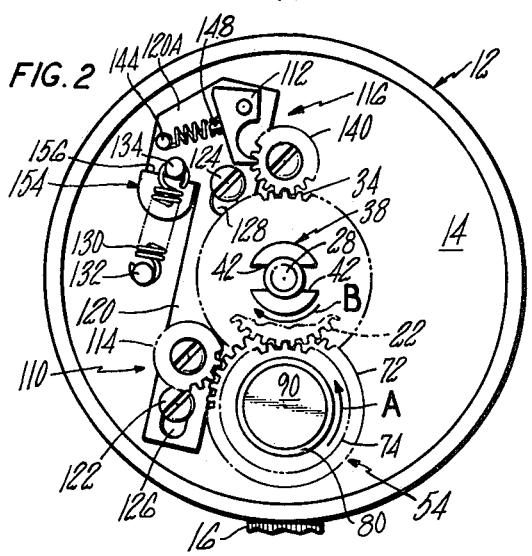
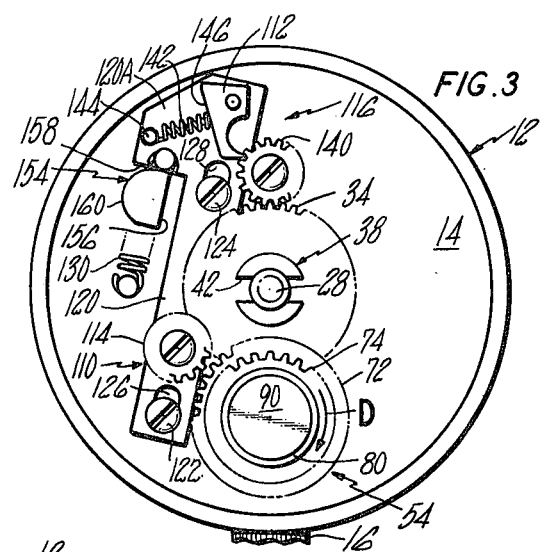
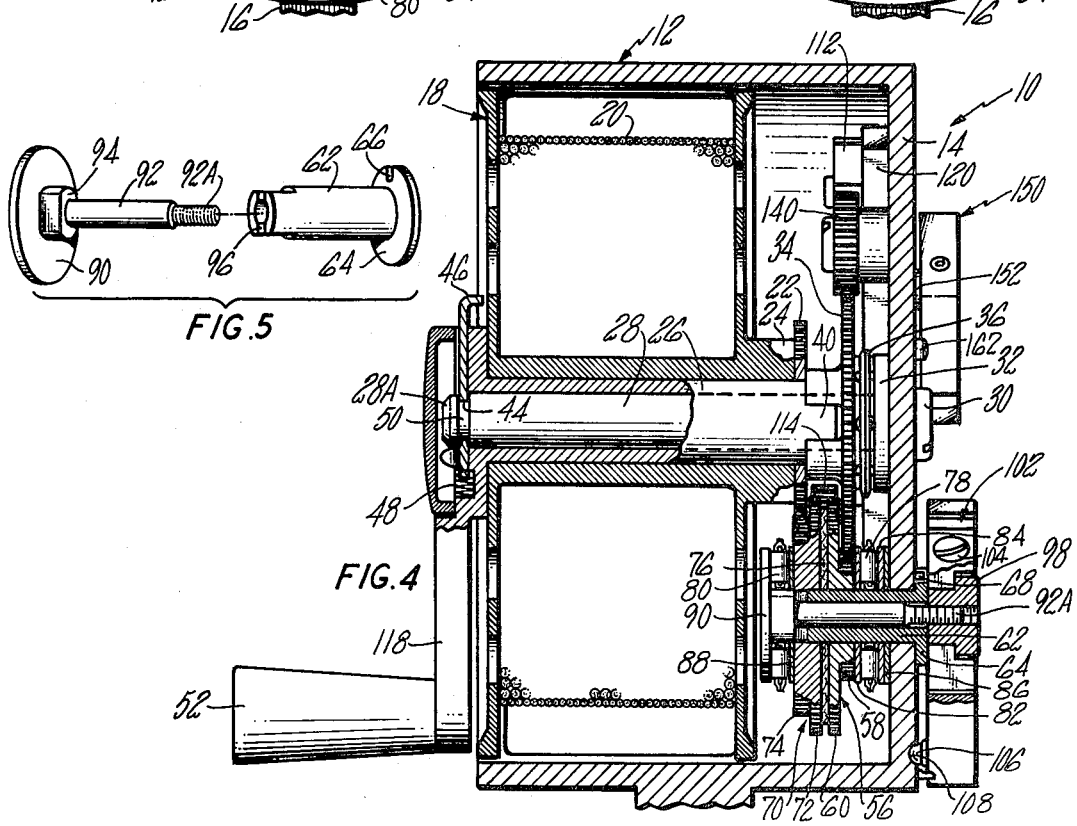

FISHING REEL DRIVE MECHANISM

This invention relates to a fishing reel drive mechanism and specifically concerns a drive mechanism useful in a fly reel for precisely controlling reel unwinding and effecting direct drive winding of the line spool.

A primary object of this invention is to provide a new and improved fishing reel incorporating a novel drive mechanism particularly suited for direct spool drive during line winding adapted to be readily thrown out to apply a controlled braking force to spool rotation during unwinding to effect a desired line tension which may be selectively adjusted and set.

Another object of this invention is to provide a new and improved reel of the type described wherein direct drive thrown-out may be effected either by operating a manual throw-out lever or by any pull on the line causing it to be unwound from the spool to actuate a friction drag brake coupling to automatically apply a controlled tension on the line during line run-out.

Yet another object of this invention is to provide such a reel wherein line drag is presettable to an adjusted tension to smoothly impart a braking force on the spool and which may be further varied by a quick and easy fine adjustment during use to match line tension to a pull exerted by a hooked fish.

A further object of this invention is to provide such a reel having a compact rugged drive mechanism particularly designed to be mounted on a closed side wall of the reel frame to effect maximum support for the drive components and facilitate removal and reassembly of a line spool relative to its frame.

A still further object of this invention is to provide such a reel having a new and improved drive mechanism of the type described which is not only compactly arranged on a closed side wall of the frame but is also comprised of a minimum number of operating components with certain components specifically designed to serve multiple functions in a construction capable of reliable use with minimum service requirements over an extensive period of time.

Other objects will in part obvious and in part pointed out more in detail hereinafter.

A better understanding of this invention will be obtained from the following detailed description and the accommpanying drawing of an illustrative application of this invention.

In the drawing:

FIG. 1 is a isometric view of a reel incorporating this invention with the reel shown partially disassembled;

FIG. 2 is an enlarged side view of the reel of FIG. 1 with certain parts omitted for purposes of clarity, showing a direct drive transmission and brake subassembly in its directt drive condition with its brake rendered ineffective;

FIG. 3 is a view similar to that of FIG. 2 wherein the drive is thrown-out and the brake is actuated;

FIG. 4 is an enlarged elevational view, partly broken away and partly in section, showing details of the reel components in assembled relation; and FIG. 5 is an enlarged isometric view showing selected components of the direct drive transmission and brake subassembly in disassembled relation.

In the drawing, a fly fishing reel 10 is illustrated having a generally cup-shaped or cylindrical frame 12 open on one side with the bottom or opposite side of the frame 12 enclosed by a wall 14. The frame 12 includes a mounting bracket 16 to be attached to a rod, not shown. A removable spool 18, having line 20 wound on the spool 18 in a standard fashion, is shown with a drive pinion 22 secured to its hub 24 for installation with the drive pinion 22 facing the closed side wall 14 of frame 12 as best seen in FIG. 1.

The hub 24 of spool 18 is freely supported for rotation on a crank shaft 26 which telescopes over a fixed main axle 28 threadably mounted to frame 12 by a screw 30 extending through a central opening in the closed side wall 14 of frame 12. The axle 28 has an integral collar 32 engaging the closed side wall 14. Between the fixed collar 32 on the axle 28 and a main rotary drive or drive gear 34 is a thrust bearing 36 which is rotatably supported on axle 28 and provides bearing support for main drive gear 34 which is also mounted for free rotation on axle 28.

The crank shaft 26 has an integral spool winding crank and operating handle. The crank shaft 26 is tubular and suited to be fitted over main axle 28 into driving engagement with a split drive collar 38 integrally formed on main drive gear 34. The driving connection between the crank shaft 26 and drive gear 34 is provided by a pair of tangs 40, 40 projecting from a free end of shaft 26 to be received in complementary openings 42, 42 of the split drive collar 38 of drive gear 34.

The spool installation is completed upon axially moving crank shaft 26 relative to the main axle 28 toward the main drive gear 34 such that a chamfered free and 28A of the main axle 28 registers with an elongated opening 44 in a spring biased clip 46 mounted on crank shaft 26. The clip 46 is forced to ride over the free end 28A of the axle 28 against the action of spring 48 which drives clip 46 back into a reduced diameter retaining groove 50 adjacent the free chamfered end 28A of axle 28, thereby mounting the spool and crank subassembly in operative position on frame 12 of reel 10.

It will be understood that the above described assembly of the spool and crank subassembly on axle 28 locates and retains the main drive gear 34 in operative position axially of the axle 28.

The drive to drive pinion 22 of spool 18 is effected for winding line 20 on spool 18 upon rotation of crank handle 52 to drive main drive gear 34 and rotate spool 18 in a line winding direction through a step-up direct drive transmission and brake subassembly 54.

The direct drive transmission and brake subassembly 54 includes a rotary input compound gear 56 having a reduced diameter gear 58 in meshing engagement with main drive gear 34, and an enlarged diameter gear 60. The rotary input 56 is supported for rotation on a second or auxiliary tubular axle 62 having an end flange 64 of enlarged diameter formed with a radial slot 66.

The auxiliary axle 62 is installed from an outside face of side wall 14 of the frame 12 with the slot 66 positioned to receive a stationary stud 68 projecting outwardly from side wall 14 to fix the auxiliary axle 62 relative to the side wall 14. Supported for rotation in coaxial alignment with rotary input 56 on the auxiliary axle 62 is a second compound gear comprising a rotary output 70 for the direct drive transmission and brake subassembly 54. Rotary output 70 is shown having a gear 72 with gear teeth corresponding in number and pitch diameter to the large gear 60 of the rotary input 56. A reduced diameter gear 74 of rotary output 70 is in meshing engagement with spool drive pinion 22.

To brake spool 18 to apply tensioning to line 20 during line run-out, a drag brake frictional coupling is shown in the preferred embodiment illustrated as a single disc 76 of suitable frictional material concentrically disposed on auxiliary axle 62 with opposite faces of disc 76 in contact engagement with confronting faces of rotary input 56 and rotary output 70 to be pressed into frictional engagement therewith upon their being relatively rotated. A pair of thrust bearings 78 and 80 of a conventional needle bearing type are mounted on auxiliary axle 62 respectively adjacent rotary input 56 and rotary output 70. Thrust washers 82 and 84 are supported on axle 62 with the thrust bearing 78 sandwiched therebetween. A suitable wave form spring washer 86 is supported on axle 62 between thrust washer 84 and side wall 14 of frame 12. Thrust washer 88 is likewise sandwiched between thrust bearing 80 and rotary output 70 with thrust bearing 80 mounted on a free end of auxiliary axle 62 adjacent a compression plate 90.

To present a drag brake frictional force on spool 18, compression plate 90 is secured against rotation relative to a free end of auxiliary axle 62 through a mounting stem 92 which has a radial boss 94 at its juncture with plate 90. Boss 94 is received in a diametrical end slot 96 of axle 62, the slot 96 being shown as being of a greater length than the axial length of boss 94. Stem 92 extends through tubular auxiliary axle 62 and is provided with a projecting threaded end 92A for connection to a brake adjustment screw 98. Brake adjustment screw 98 may be manually rotated, for example, by a screwdriver bit, not shown, received within screw slot 100 to selectively draw compression plate 90 in a direction toward side wall 14 of fame 12 against a biasing force of spring washer 86 to axially shift the rotary output 70 a discrete amount and compress friction disc 76 between confronting faces of rotary input 56 and rotary output 70.

Depending on the amount of drag desired to be applied to spool rotation in relation to the spool rotation and the breaking strength of the tackle, adjustment screw 98 may thus be manually rotated to drive compression plate 90 against the action of spring washer 86, or be backed off to reduce the compression exerted on the friction disc 76. Thereafter, screw 98 is fixed in adjusted position relative to a drag adjustment control lever 102 by securing a bifurcated end of control lever 102 about the adjustment screw 98 by simply tightening a retaining screw 104 received in aligned laterally extending threaded openings, not shown, in split ends 102A, 102A of the control lever 102.

To also provide for quick and easy fine adjustment during use of the reel 10, the foregoing construction is particularly suited to effect rapid adjustment of the braking force within the settable limits by selectively rotating the control lever 102 and the adjustment screw 98 which is fixed thereto as a unit to adjust the force by which the confronting faces of the rotary input 56 and rotary output 70 are pressed against disc 76. Rotation of lever 102 in one direction axially shifts stem 92 and compression plate 90 a discrete amount to axially move rotary output 70 relative to rotary input 56 against the biasing force of spring washer 86, to increase the frictional drag. Reverse rotation of lever 102 shifts stem 92 in an opposite axial direction and spring washer 86 takes up the play to maintain the brake operating components on auxiliary axle 62 in operative assembly while reducing the frictional drag. Such fine adjustment is effected by manual manipulation of control lever 102 which is secured in desired adjusted position by a spring biased detent or ball 106 mounted on a foot of drag adjustment control lever 102 for selective engagement with a selected one of a series of dimples 108 formed on the outside face of frame side wall 14.

In accordance with another aspect of this invention, a unitary drive and brake operator 110 is provided for operating the direct drive transmission and brake subassembly 54 with the unitary drive and brake operator 110 having mounted thereon both a no-back device component 112 and a direct drive coupling 114. No-back device 116 is operatively connected to rotary input 56 to limit its movement against rotation in one selected angular direction to prevent line unwinding which would effect undesired reverse rotation of crank 118. The direct drive coupling 114 selectively drives spool 18 upon rotating crank 118 to wind spool 18 directly through the geared components but without effecting such a drive through the brake.

More specifically, the drive and brake operator 110 comprises a single operating bar 120 supported on the inside face of the closed side wall 14 of frame 12 for sliding or shifting movement between first and second limit positions respectively illustrated in FIGS. 2 and 3. To establish the first and second limit positions, a pair of guide limit stops 122 and 124 are shown fixed to side wall 14 and received within elongated guide openings 126 and 128 in operating bar 120. The latter is normally urged into its first limit position (FIG. 2) under the biasing force of a tension spring 130 having one end connected to a post 132 fixed to side wall 14 and an opposite end of the spring 130 connected to a stud 134 fixed to a foot 120A of operating bar 120.

To directly drive spool 18 in a line winding direction without effecting the drive through the brake 76, direct drive coupling or drive gear 114 is rotatably supported on operating bar 120 for meshing engagement with enlarged diameter gears 60 and 72 of rotary input 56 and rotary output 70 when operating bar 120 is in its first limit position (FIG 2).

Accordingly, with operating bar 120 in its normal first limit position, spool 18 is drive in a line winding direction upon rotating crank 118 to drive the rotary input 56 and rotary output 70 in a first angular direction (counterclockwise as seem by arrow A in FIG. 2). This action effects a direct drive via direct drive gear 114 to rotate the spool drive pinion 22 in a line winding direction (clockwise as shown by arrow B in FIG. 2).

In the construction of fly fishing reels of the type shown, the line 20 is paid-out initially from spool 18 by manually withdrawing line 20 directly from spool 18 with crank 118 being held against rotary movement. To this end, no-back device 116 is operatively connected to rotary input 56 which limits its movement and the crank movement against reverse rotation; i.e., the rotary input 56 is limited against movement in a clockwise direction as seen in FIG. 2. The no-back device 116 comprises a ratchet wheel 140 supported for rotation on side wall 14 of frame 12 with ratchet teeth engaging a pawl 112 pivotally supported on operating bar 120 and continuously biased into engagement with the teeth of ratchet 140 by means of a compression spring 142. Opposite ends of spring 142 are suitably mounted to a post 144 on the foot 120A of operating bar 120 and a flat 146 on pawl 112, the pawl 112 preferably having a spring retaining post 148 about which compression spring 142 is coiled for retaining the spring 142 in operative association with pawl 112.

To permit line run-out on the spool, a direct drive throw-out lever 150 is mounted on the outside face of frame side wall 14 on a pivot pin 152 fixed to lever 150 and extending through side wall 14 to be connected to a cam control 154. The cam control 154 has a flat 156 shown in FIG. 2 as being engageable with a corresponding flat cam engagement surface 158 on the foot 120A of operating bar 120, and an arcuate cam surface 160 merging with the flat 156 on the cam control 154. With the lever 150 in its illustrated ON position established by stop 162 projecting from the side wall 14, cam control 154 is located in the position shown in FIG. 2 with operating bar 120 in its first limit position. Rotation of the direct drive throw-out lever 150 in a counterclockwise direction about pivot pin 152 as indicated by arrow C in FIG. 1 from its illustrated ON position, into its OFF position established by stop 164, pivots the cam control 154 to move operating bar 120 against its biasing spring 130 into a second limit position (FIG. 3) which is shown cooperatively established by the cam control 154 and guide limit stops 122 and 124.

In its second limit position, the throw of operating bar 120 has shifted it a distance sufficient to move the direct gear 114 into disengaged relation to the large gears 60 and 72 of rotary input 56 and rotary output 70. In the disengaged position of the direct drive gear 114, spool 18 may rotate in a line unwinding direction and thereby drive the rotary output 70 in a clockwise direction (arrow D in FIG. 3) via the spool drive pinion 22 to effectively operate the drag brake friction coupling 76. The latter applies a drag frictional force to the rotary output 70 and thus spool 18 due to the locking of the rotary input 56 against rotation in a clockwise direction due to the no-back pawl 112 preventing reverse rotation of ratchet wheel 140 in a clockwise direction (FIG. 3) with operating bar 120 in its second limit position.

By virtue of the above-described construction, the drive mechanism of this invention also automatically provides for direct drive throw-out even when throw-out lever 150 is in its ON position as shown in FIG. 1 with cam control 154 in its corresponding first operating position as shown in FIG. 2. That is, due to the provision of no-back device 116, direct actuation of operating bar 120, without use of throw-out lever 150, is automatically caused by any pull on the line which rotates the spool 18 in a line unwinding direction with handle 52 released, causing operating bar 120 to move from its first limit position (FIG. 2) into its second limit position (FIG. 3).

Limited reverse movement of crank 118 is permitted to an extent determined by guide limit stops 122, 124 such that main drive gear 34 may be driven by crank 118 through a very few degrees in a counterclockwise direction, as viewed in FIGS. 2 and 3. This action rotates the ratchet wheel 140 in a clockwise direction and effects a drive through pawl 112 to throw operating bar 120 from its first limit position (FIG. 2) into its second limit position (FIG. 3) against the guide limit stops 122, 124. These stops establish the second limit position of operating bar 120 and the disengaged position of the direct drive coupling 114, thereby releasing the spool 18 to rotate in a line unwinding direction against the controlled braking force applied to spool 18 by the drag friction coupling 76 to effect line tensioning during run-out.

The reel 10 of this invention will be seen to provide direct drive of spool 18 for winding line 20 on spool 18 without driving through an operative brake. The direct drive connection between the crank 118 and spool 18 is readily thrown out either manually by actuating the throw-out lever 150 or automatically by spool rotation in an unwinding direction to apply a controlled braking force onto spool 18 during unwinding with the brake 76 actuated to tension line 20 to a degree desired by the setting of the brake adjustment 98. Moreover, the reel 10 described has a compact rugged construction which serves to mount the main operating components of the described drive mechanism on only one side wall of the frame 12 wherein maximum support for the operating components is effected in addition to providing for facile spool removal and reassembly as well as for effecting any necessary minor repair or parts replacement which may be required. In short, the reel of this invention attains substantially total control over reel winding and unwinding.

As will be apparent to persons skilled in the art, various modifications, adaptations and variations of the foregoing specific disclosure can be made without departing from the teachings of this invention.

I claim:

1. A fishing reel comprising a cup-shaped frame, a line spool, means for removably supporting the spool on the frame for rotation, a direct drive transmission and brake subassembly mounted on a supporting axle in offset parallel relation to the rotational axis of the spool, a unitary drive and brake operator selectively movable between first and second positions respectively for establishing a direct drive for spool winding and alternatively actuating the brake while permitting reverse rotation of the spool with a controlled braking force applied thereto for tensioning the line during run-out, means for operatively mounting the direct drive transmission and brake subassembly and the drive and brake operator on the bottom of the cup-shaped frame, a crank operated main rotary drive, means for mounting the rotary drive in coaxial relation to the spool, the direct drive transmission and brake subassembly including a rotary input and a rotary output, the rotary input being drivingly connected to the rotary drive and rotatable thereby in a first angular direction, the rotary output being drivingly connected to the spool to rotate the spool in a line winding direction responsive to rotation of the rotary input in said first angular direction, and a no-back device drivingly connected to the rotary input and limiting its movement against rotation in a direction opposite said first angular direction.

2. The reel of claim 1 wherein the direct drive transmission and brake subassembly includes a drag brake friction coupling between the rotary input and rotary output and operable upon relative rotation thereof, and wherein the unitary drive and brake operator includes a direct drive coupling movable into an engaged position when the operator is in said first position, the direct drive coupling in engaged position drivingly connecting the rotary input and rotary output to drive the spool in said line winding direction, the drive coupling being movable into a disengaged position when the operator is in said second position, the direct drive coupling in disengaged position permitting reverse rotation of the rotary output responsive to said reverse rotation of the spool in a line unwinding direction such that with the no-back device locking the rotary input against rotation in said opposite angular direction, the drag brake friction coupling operates to apply a controlled braking force to the spool, tensioning line run-out.

3. A fishing reel comprising a frame, a crank shaft, means supporting the crank shaft for rotation on the frame, a main rotary drive drivingly connected to the crank shaft, a crank handle being fixed to the crank shaft for rotating the rotary drive, a rotatable line spool, the crank shaft serving as a bearing supporting the spool for rotation, a rotary input drivingly connected to the rotary drive, a rotary output drivingly connected to the spool, means supporting the rotary input and output for rotation on the frame, the rotary input being rotatable in a first angular direction for driving the rotary output to rotate the spool in a line winding direction, a no-back device, means supporting the no-back device on the frame, the no-back device drivingly connected to the rotary input and limiting its movement against rotation in a direction opposite said first angular direction, a drag brake friction coupling between the rotary input and rotary output operable upon relative rotation of the rotary input and rotary output, and a direct drive coupling selectively movable between an engaged position and a disengaged position, the direct drive coupling in engaged position drivingly connecting the rotary input and rotary output to drive the spool in a line winding direction, the drive coupling in disengaged position permitting reverse rotation of the rotary output responsive to rotation of the spool in a line unwinding direction such that with the no-back device locking the rotary input against rotation in said opposite angular direction, the drag brake friction coupling operates to apply a controlled braking force to the spool, tensioning the line during run-out.

4. The reel of claim 3 wherein the no-back device comprises a rotatable ratchet wheel and a no-back pawl supported for pivotal movement and biased toward the ratchet wheel for operative engagement therewith, and wherein the main rotary drive comprises a drive gear in meshing engagement with the ratchet wheel.

5. The reel of claim 3 further including a drive and brake operator, means mounting said operator for movement on the frame, a limit stop on the frame cooperating with the operator for establishing first and second limit positions for the operator, the direct drive coupling being supported for rotation on the operator, the operator in its first limit position establishing said engaged position of the direct drive coupling, and the operator in its second limit position establishing said disengaged positin of the direct drive coupling.

6. The reel of claim 5 wherein spring means is connected between the frame and the operator and biasing the operator toward its first limit position with the direct drive coupling in engaged position.

7. The reel of claim 3 wherein the rotary input and rotary output are supported for rotation in adjacent coaxial relation to one another, and wherein the friction coupling comprises a disc of frictional material mounted between the rotary input and rotary output to be pressed into frictional engagement therewith for applying a braking force to the spool upon rotation of the rotary output relative to the rotary input.

8. The reel of claim 7 further including drag brake adjustment means for selectively compressively engaging the friction disc between the rotary input and rotary output to establish a preselected brake force to be applied to the spool to preset the drag imposed on the line during run-out.

9. The reel of claim 3 wherein said means supporting the rotary input and output for rotation on the frame comprises an axle mounted on the frame in offset parallel relation to the crank shaft, the rotary input and rotary output members being coaxially supported for rotation on the axle.

10. A fishing reel comprising a frame, a crank operated main rotary drive, a rotatable line spool, means for supporting the main rotary drive and the spool for rotation on the frame in coaxial relation to one another, a rotary input drivingly connected to the rotary drive, a rotary output drivingly connected to the spool, the rotary input and rotary output being supported for rotation about an axle establishing a rotational axis in offset parallel relation to the rotational axis of the main rotary drive and the spool, the rotary input being rotatable in a first angular direction for driving the rotary output to rotate the spool in a line winding direction, a no-back device, means supporting the no-back device on the frame, the no-back device drivingly connected to the rotary input and limiting its movement against rotation in a direction opposite said first angular direction, a drag brake friction coupling comprising a friction disc coaxially disposed between the rotary input and rotary output and operable upon relative rotation of the rotary input and rotary output, and a direct drive coupling selectively movable between an engaged position and a disengaged position, the direct drive coupling in engaged position drivingly connecting the rotary input and rotary output to drive the spool in a line winding direction, the drive coupling in disengaged position permitting reverse rotation of the rotary output responsive to rotation of the spool in a line unwinding direction such that with the no-back device locking the rotary input against rotation in said opposite angular direction, the drag brake friction coupling operates to apply a controlled braking force to the spool, tensioning the line during run-out.

11. The reel of claim 10 wherein the axle is a fixed tubular member, wherein drag brake adjustment means is provided including a compression plate having an integral stem extending through an axial opening in said tubular axle, the stem of the compression plate being held against rotation relative to the axle but being axially movable therein for selectively applying an adjusted compression force to the friction disc between the rotary input and rotary output.

12. The reel of claim 11 further including a manual drag adjustment control having a threaded connection to the stem of the compression plate, rotary movement of the adjustment control serving to selectively establish a brake force to be applied to the spool responsive to shifting of the stem axially of the axle to adjust drag imposed on the spool for line run-out.

13. The reel of claim 12 wherein a drag adjustment control lever is mounted on the adjustment control and supported thereby for rotary movement, and wherein retaining means is provided on the drag adjustment control lever for securing it to the drag adjustment control in a preselected setting, whereby movement of the control lever rotates the adjustment control relative to the stem to provide a fine adjustment of the drag brake during operation.

14. The reel of claim 13 further including detent means between the control lever and the frame for releasably maintaining the control lever in a selected fine adjustment position during operation.

15. A fishing reel comprising a frame, a crank, a crank operated main drive gear, a line spool, a first axle supporting the crank, the main drive gear and the spool for rotation on the frame, a second axle supported on the frame, a rotary input supported on the second axle and drivingly connected to the main drive gear, a rotary output supported on the second axle and drivingly connected to the spool, the rotary input being rotatable in a first angular direction for driving the rotary output to rotate the spool in a line winding direction, a no-back device, means supporting the no-back device on the frame, the no-back device drivingly connected to the rotary input and limiting its movement against rotation in a direction opposite said first angular direction, a drag brake friction coupling between the rotary input and rotary output operable upon relative rotation of the rotary input and rotary output, a drive and brake operator, means for mounting the drive and brake operator for movement on the frame, a direct drive and brake operator for movement on the frame, a direct drive coupling supported for rotation on the operator and selectively movable between an engaged position and a disengaged position, the drive coupling in engaged position drivingly connecting the rotary input and rotary output to drive the spool in a line winding direction, the drive coupling in disengaged position permitting reverse rotation of the rotary output responsive to rotation of the spool in a line unwinding direction such with the no-back device locking the rotary input against rotation in said opposite angular direction, the drag brake friction coupling operates to apply a controlled braking force to the spool, tensioning the line during run-out, and a limit stop on the frame cooperating with the drive and brake operator for establishing first and second limit positions for the operator, the operator in its first limit position establishing said engaged position of the direct drive coupling, and the operator in its second limit position establishing said disengaged position of the direct drive coupling, the no-back device including a ratchet wheel in continuous meshing engagement with the main drive gear and a no-back pawl supported on the drive and brake operator for pivotal movement and biased toward the ratchet wheel for operative engagement therewith, whereby reverse movement of the spool in a line unwinding direction, initiated by any pull on the line with the operator in said first limit position and the crank released, causes the main drive gear to rotate to apply a driving force to the operator through the ratchet wheel and the pawl to an extent limited by the limit stop to shift the operator from its first limit position to its second limit position and thereby move the direct drive coupling into its disengaged position to operate the brake and tension the line during run-out.

16. A fishing reel comprising a frame, a crank operated main rotary drive, a rotatable line spool, a first axle supporting the rotary drive and spool for rotation on the frame, a second axle supported on the frame, a rotary input supported on the second axle and drivingly connected to the rotary drive, a rotary output supported on the second axle and drivingly connected to the spool, the rotary input being rotatable in a first angular direction for driving the rotary output to rotate the spool in a line winding direction, a no-back device, means supporting the no-back device on the frame, the no-back device drivingly connected to the rotary input and limiting its movement against rotation in a direction opposite said first angular direction, a drag brake friction coupling between the rotary input and rotary output operable upon relative rotation of the rotary input and rotary output, a drive and brake operator, means for mounting the drive and brake operator for movement on the frame, a direct drive coupling supported for rotation on the operator and selectively moveable between an engaged position and a disengaged position, the drive coupling in engaged position drivingly connecting the rotary input and rotary output to drive the spool in a line winding direction, the drive coupling in disengaged position permitting reverse rotation of the rotary output responsive to rotation of the spool in a line unwinding direction such that with the no-back device locking the rotary input against rotation in said opposite angular direction, the drag brake friction coupling operates to apply a controlled braking force to the spool, tensioning the line during run-out, a limit stop on the frame cooperating with the drive and brake operator for establishing first and second limit positions for the operator, the operator in its first limit position establishing said engaged position of the direct drive coupling, and the operator in its second limit position establishing said disengaged position of the direct drive coupling, a control cam mounted on the side wall of the frame, the control cam being engageable with the drive and brake operator for selectively moving it between its first and second limit positions, and a direct drive throw-out lever connected to the control cam and located outside the side wall of the frame for manually shifting the operator between its first and second limit positions to alternatively effect direct driving and braking of the spool respectively for line winding and unwinding.

17. A fishing reel comprising a frame, a crank operated main drive gear, a rotatable line spool, means supporting the drive gear and spool for rotation on the frame, a rotary input drivingly connected to the main drive gear, a rotary output drivingly connected to the spool, the rotary input being rotatable in a first angular direction for driving the rotary output to rotate the spool in a line winding direction, a no-back device drivingly connected to the rotary input and limiting its movement against rotation in a direction opposite said first angular direction, a drag brake friction coupling between the rotary input and rotary output operable upon relative rotation of the rotary input and rotary output, and a direct drive coupling selectively movable between an engaged position and a disengaged position, the direct drive coupling in engaged position drivingly connecting the rotary input and rotary output to drive the spool in a line winding direction, the drive coupling in disengaged position permitting reverse rotation of the rotary output responsive to rotation of the spool in a line unwinding direction such that with the no-back device locking the rotary input against rotation in said opposite angular direction, the drag brake friction coupling operates to apply a controlled braking force to the spool, tensioning the line during run-out, the rotary input and rotary output being coaxially aligned compound gears, the rotary input and the rotary output having corresponding gears interconnected to effect a direct drive to the spool upon meshing engagement with an idler gear comprising the direct drive coupling, the spool having a pinion secured thereto in continuous meshing engagement with a second gear of the compound rotary output gear, and the compound rotary input gear having a second gear in continuous meshing engagement with the main drive gear.

18. A fishing reel comprising a frame, a crank operated main rotary drive, a rotatable line spool, means supporting the main rotary drive and spool for rotation on the frame, a rotary input drivingly connected to the rotary drive, a rotary output drivingly connected to the spool, means supporting the rotary input and rotary output for rotation in adjacent coaxial relation to one another, the rotary input being rotatable in a first angular direction for driving the rotary output to rotate the spool in a line winding direction, a no-back device drivingly connected to the rotary input and limiting its movement against rotation in a direction opposite said first angular direction, a drag brake friction coupling comprising a disc of frictional material mounted between the rotary input and rotary output to be pressed into frictional engagement therewith for applying a braking force to the spool upon rotation of the rotary output relative to the rotary input, a direct drive coupling selectively movable between an engaged position and a disengaged position, the direct drive coupling in engaged position drivingly connecting the rotary input and rotary output to drive the spool in a line winding direction, the drive coupling in disengaged position permitting reverse rotation of the rotary output responsive to rotation of the spool in a line unwinding direction such that with the no-back device locking the rotary input against rotation in said opposite angular direction, the drag brake friction coupling operates to apply a controlled braking force to the spool, tensioning the line during run-out, and drag brake adjustment means including a control lever movably mounted outside the frame for varying the compressive engagement of the friction disc by the rotary input and rotary output, and detent means between the lever and the frame for maintaining the control lever in a desired brake adjustment position during operation of the reel to establish a preselected brake force to be applied to the spool to preset the drag imposed on the line during run-out.

* * * * *